United States Patent [19]

Hanslik

[11] 3,927,869

[45] Dec. 23, 1975

[54] MULTISCREW EXTRUDER

[75] Inventor: Wilhelm Hanslik, Vienna, Austria

[73] Assignee: Krauss-Maffei Aktiengesellschaft, Munich, Germany

[22] Filed: Sept. 24, 1973

[21] Appl. No.: 400,059

[30] Foreign Application Priority Data

Sept. 27, 1972 Germany............................ 2247286

[52] U.S. Cl................................. 259/192; 425/376
[51] Int. Cl.² ......................................... B29B 1/10
[58] Field of Search ........... 259/192, 185, 191, 151, 259/6, 104; 425/202, 376, 204; 418/197, 201, 71

[56] References Cited
UNITED STATES PATENTS

| | | | |
|---|---|---|---|
| 2,588,888 | 3/1952 | Sennet.................................. | 418/71 |
| 3,291,061 | 12/1966 | Shinohara........................... | 418/197 |
| 3,640,669 | 2/1972 | Hanslik............................... | 425/376 |

Primary Examiner—Harvey C. Hornsby
Assistant Examiner—Donald B. Massenberg
Attorney, Agent, or Firm—Karl F. Ross; Herbert Dubno

[57] ABSTRACT

The discharge end of the housing of an extruder comprising two or more meshing feed screws, formed with parallel and intercommunicating cylindrical chambers for the several screws, is provided along the chamber walls with axially extending recesses confronting an entrance throat of an interchamber passage in which the entrained plastic mass exerts a maximum lateral thrust upon these screws. The recesses, designed to build up a counterthrust, lie in regions diametrically opposite the entrance throat or are more or less symmetrically distributed about these regions.

8 Claims, 5 Drawing Figures

MULTISCREW EXTRUDER

BACKGROUND OF THE INVENTION

1. Field of the Invention

My present invention relates to an extruder for thermoplastic resins or the like of the type wherein two or more driven feed screws, extending parallel to the axis of a common housing within respective cylindrical chambers thereof, mesh with one another in one or more interchamber passages whose width is less than the chamber diameter.

2. Background of the Invention

Two such counterrotating feed screws in mesh with each other define in their interchamber passage an entrance throat into which the plastic mass moving toward the discharge end of the housing is frictionally entrained so as to produce a local increase in pressure. That pressure, acting upon the cores of the feed screws, gives rise to radially outward lateral thrusts which must be absorbed by the respective chamber walls. As a result, the feed screws in the housing are subject to increased wear, especially in the high-pressure region adjacent the discharge or nozzle end of the extruder housing. Moreover, the increased friction between the feed screws and their housing limits their speed of rotation whereas the local development of frictional heat impairs the uniformity of the plastic mass ahead of the nozzle and therefore also that of the extruded product (or of molded parts if the extruder is used to feed the plastic mass to a mold cavity of an injection-molding machine).

OBJECTS OF THE INVENTION

The general object of my present invention, therefore, is to provide means in such an extruder for counteracting the aforementioned lateral thrusts to avoid the disadvantages enumerated above.

A more particular object is to facilitate the lubrication of the contact surface between housing and feed screw around the periphery of the latter.

SUMMARY OF THE INVENTION

These objects are realized, in accordance with my present invention, by providing the extruder housing in the vicinity of its discharge end with one or more axially extending shallow peripheral recesses in at least two of the screw chambers at a location remote from the entrance side of a passage leading to an adjoining chamber, thereby generating a counterthrust to keep the associated feed screw centered within its chamber. In the case of a single recess its location should be generally diametrically opposite the entrance side or throat of the passage; in the case of two recesses, they are advantageously disposed substantially symmetrically on both sides of an axial plane passing through that throat.

If there are only two counterrotating feed screws, each housing chamber should have a recess or a pair of recesses at the locations described. If, however, a central screw meshes with two or more planetary screws symmetrically disposed therearound, the central screw is not subjected to lateral thrusts so that only the chambers for the planetary screws need to be provided with such recesses.

BRIEF DESCRIPTION OF THE DRAWING

The above and other features of my invention will now be described in detail with reference to the accompanying drawing in which.

SPECIFIC DESCRIPTION

Figure 1:
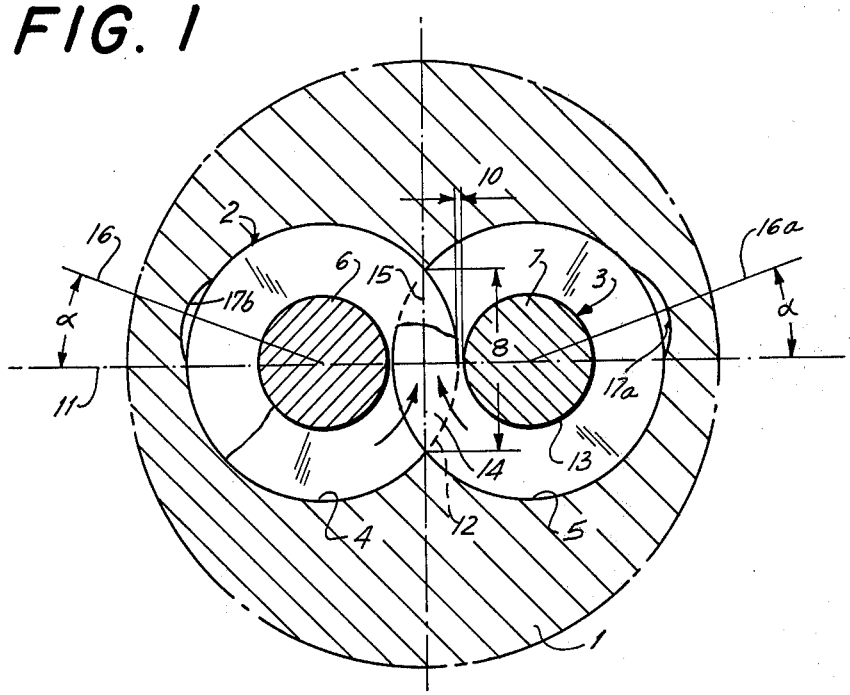
FIG. 1 shows, in a cross-sectional view taken near its discharge end, an extruder with dual feed screws embodying my invention.

Reference will first be made to FIGS. 1 – 4 in which I have shown the forward part of the housing 1 of an extruder adapted to be used, for example, to feed a thermoplastic mass into a mold cavity of an injection-molding machine. Housing 1 has two cylindrical chambers 4 and 5 equispaced from the housing axis to accommodate a pair of counterrotating feed screws 2 and 3 driven by a motor (not shown). The screws are journaled in the housing with interposition of nonillustrated thrust bearings at their rear extremities to take up the reaction force of a flowable mass of thermoplastic material which is continuously advanced toward a nozzle (not shown) at the front end of the housing; to keep the plastic material in its liquefied state, the housing may be heated as is well known per se.

The helical threads of screws 2 and 3 intermesh within a passage 8 through which the two chambers 4 and 5 communicate with each other, this passage being spanned by a common chord of two intersecting circular outlines of these chambers. A small transverse gap 10 exists between the outer periphery of one screw (e.g. the edge 12 of the web of screw (2) and the peripheral surface of the core of the other screw (as illustrated at 13 for the core 7); other, longitudinal gaps are present between the flanks of the meshing screw threads, their widths being determined by the relative width of the web, the pitch angle and the number of interleaved threads. With screws 2 and 3 rotating counterclockwise and clockwise, respectively, as viewed in FIGS. 1 – 3, the lower half of passage 8 constitutes its entrance side or throat 14 whereas the upper half forms its exit side 15. The plastic mass frictionally entrained by the threads of one screw is prevented by the blocking action of the threads of the other screw from rotating therewith about the screw axis, yet a certain pressure rise occurs in the throat 14 which tends to drive the two screws apart along axial planes 16 and 16a generally including an angle $\alpha$ on the order of 20° with a common axial plane 11 of the two screws. With the mass as a whole advancing axially toward the extruder nozzle, a portion thereof escapes through the aforementioned gaps; this escape may be referred to as slip.

With a slip ratio of up to 70% the pressure gradient within the interturn spaces substantially equals the longitudinal pressure drop per turn in the discharge region of the extruder housing. With larger slip ratios that pressure gradient increases and results in a higher pressure drop across the exit side 15 of passage 8 and consequent intensification of the lateral thrust in planes 16 and 16a.

According to Hertz's analysis the specific area pressure is reduced with closer tolerances between the screw and its cylinder chamber. A close fit, however, has been found practical only with relatively low rotary speeds and with admixture of lubricant with the working medium. At higher speeds and/or with more viscous working media, the wear becomes excessive in such cases.

Thus, as a practical matter, the chamber diameter slightly exceeds the screw diameter to provide a narrow peripheral clearance into which the plastic mass can penetrate to form a thin lubricating film. The width of this clearance depends on such factors as rotary speed, pitch, relative web width, pressure gradient, and viscosity or flowability of the plastic working medium. Generally, the clearance should be so narrow as not to cause an appreciable pressure loss and to maintain a substantially even temperature profile throughout the cross-section of each chamber.

Figure 2:
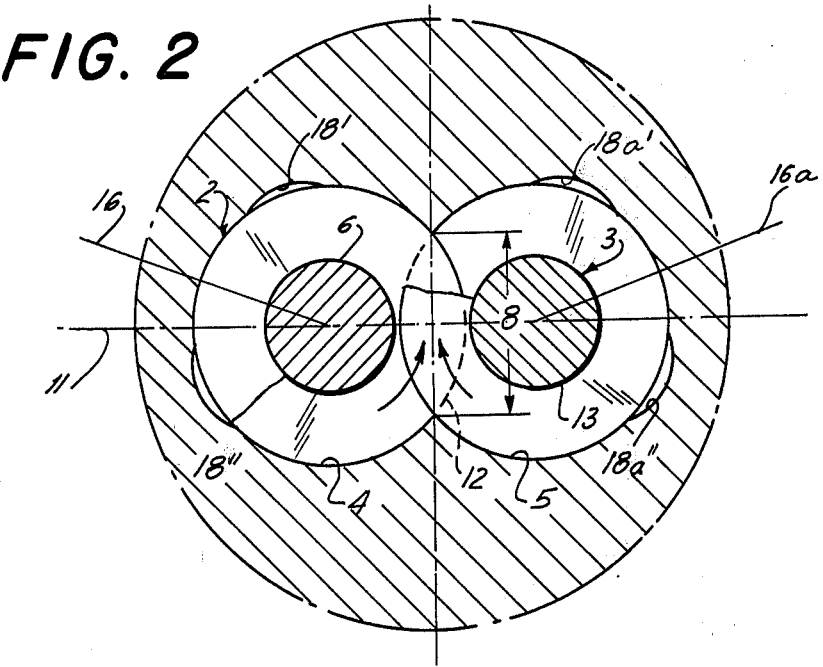
FIGS. 2 and 3 are views similar to FIG. 1, illustrating two modifications.
Figure 3:
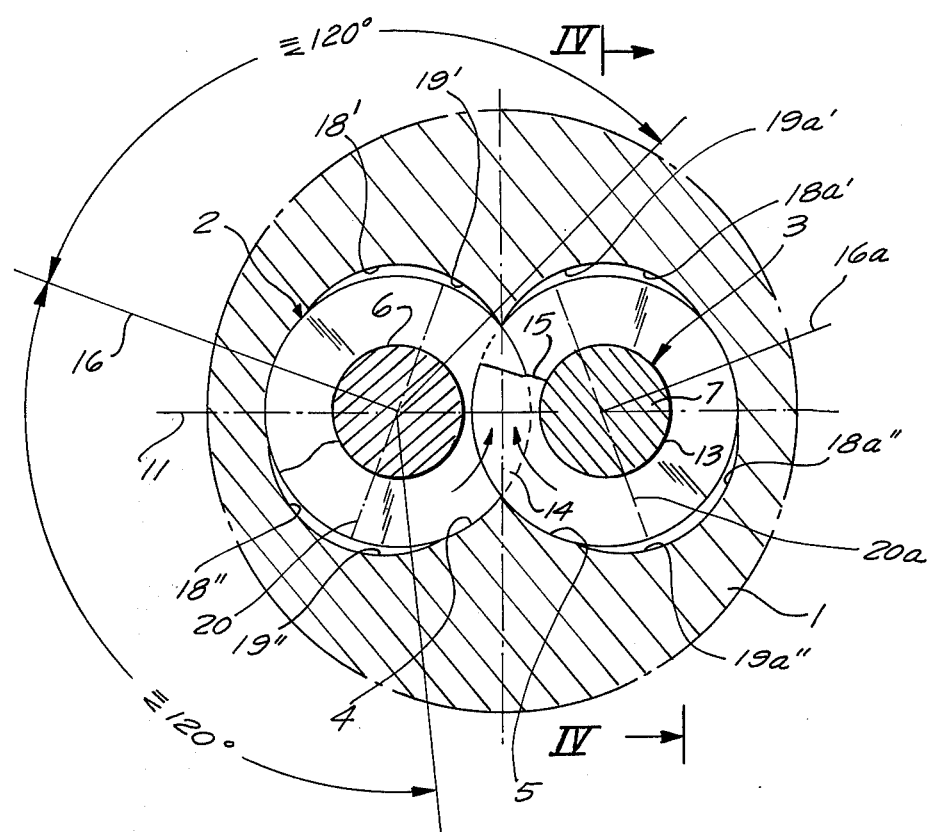

In order to keep the screws 2 and 3 centered within their respective chambers 4 and 5, and to ensure adequate lubrication with peripheral clearances of minimum width, I provide each of these chambers with a respective axially extending shallow peripheral recess 17, 17a (FIG. 1), bisected by the corresponding thrust plane 16, 16a, or with a pair of such recesses 18', 18'' and 18a', 18a'' symmetrically disposed with reference to that plane (FIG. 2). These recesses serve as receptacles for working medium under pressure which opposes the radially outward lateral force exerted by the plastic mass in throat 14. Aside from this centering function, the recesses also constitute lubricant reservoirs and help reduce the shear forces which act upon the plastic mass; the reduction in shear forces can be enhanced by extending the recesses, as shown in FIGS. 3 at 19', 19'' and 19a', 19a'', toward the passage 8 while ending them short of that passage to ensure proper guidance for the feed screws. As further indicated in FIG. 3, the extended recesses may reach beyond a plane 20, 20a perpendicular to their respective plane of symmetry 16, 16a, terminating along boundary lines which are peripherally spaced from that plane by up to about 120°.

Figure 4:
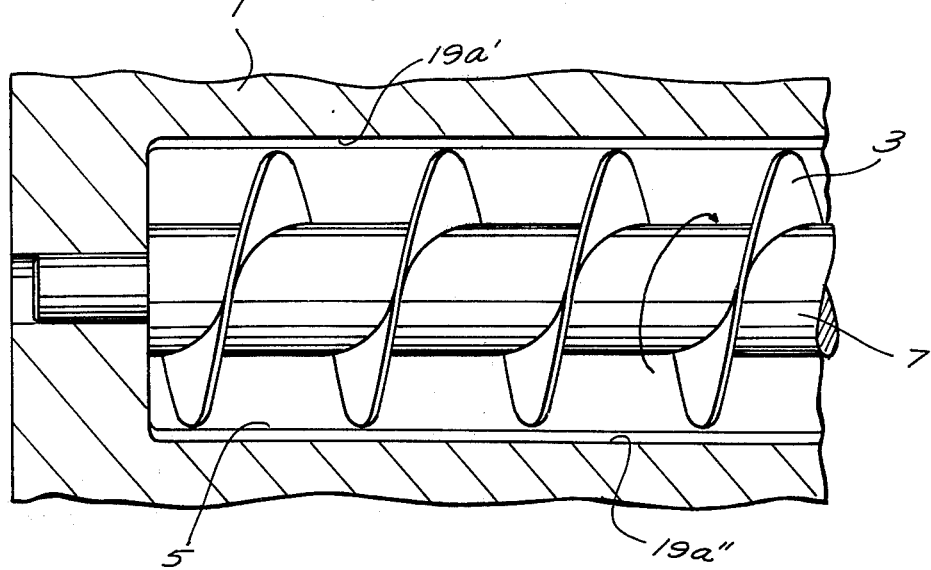
FIG. 4 is an axial sectional view of the forward part of an extruder, taken on the line IV — IV of FIG. 3.

As seen in FIG. 4, the recesses of FIGS. 1 – 3 extend with constant depth practically to the end of chambers 4 and 5, spanning a multiplicity of turns of the associated screw threads.

Naturally, the admixture of a lubricant with a plastic mass may also be resorted to in the operation of my improved extruder.

The cross-sections of the recesses shown in FIGS. 1 and 3 are generally crescent-shaped, with a more or less tangential fairing of their sides into the cylindrical chamber periphery. The outer curvature of the crescent is preferably circular, for simplicity of manufacture, though this is not critical. Moreover, the recesses need not be continuous over the entire length of the housing portion shown in FIG. 4 but could be longitudinally subdivided into shorter sections. The centrally disposed recess 17 or 17a may also be combined with a pair of laterally offset recesses 18', 18'' or 18a', 18a'' (with or without extensions as shown in FIGS. 3 and 2) in a single housing; in such a case the peripherally juxtaposed recesses may be fully separated or may merge into one another.

Figure 5:
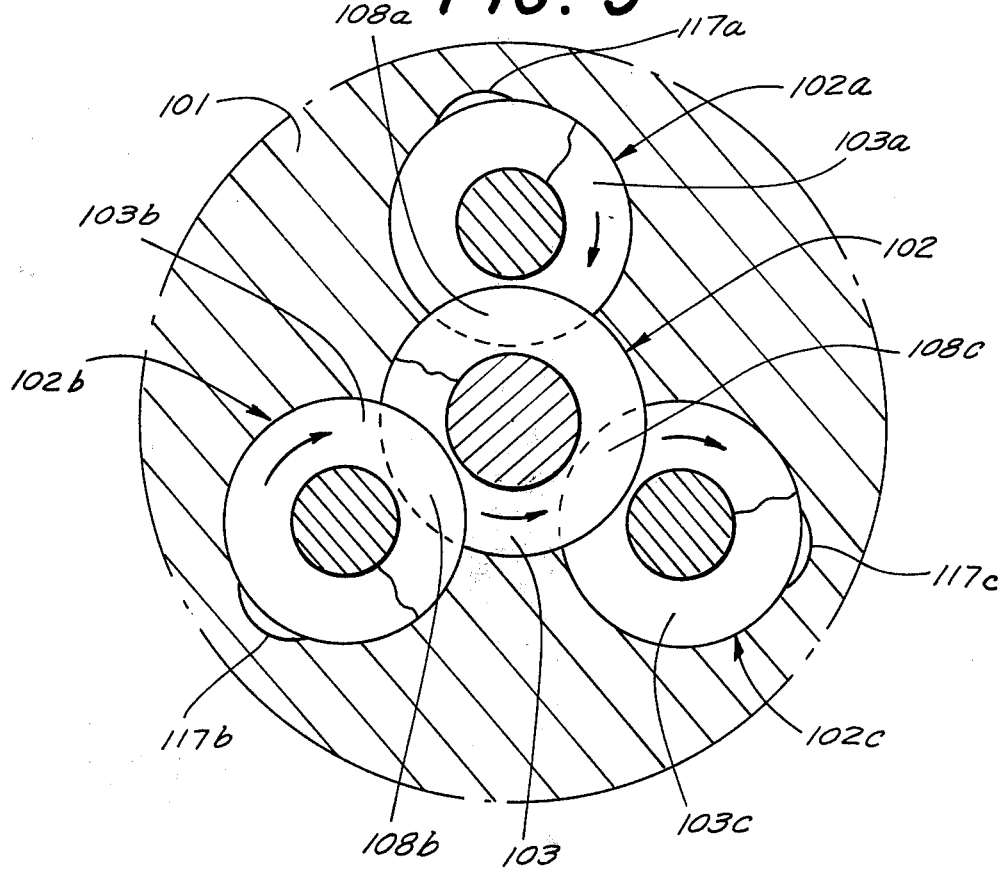
FIG. 5 is a cross-sectional view similar to FIGS. 1 – 3, drawn to the same scale and showing an extruder with a central screw driving several planetary screws.

In FIG. 5 I have illustrated a modified extruder whose housing 101 has a central chamber 102 and three satellite chambers 102a, 102b, 102c communicating therewith in the aforedescribed manner, these chambers accommodating a central screw 103 rotating in one sense (here counterclockwise) and three satellite screws 103a, 103b, 103c rotating in the opposite sense (here clockwise). The satellite chambers are provided with longitudinal recesses 117a, 117b, 117c at locations diametrically opposite the entrance throats of the passages 108a, 108b, 108c through which these chambers communicate with the central chamber 102. As explained above, there is no need for providing any such recesses at the latter chamber.

It will thus be seen that I have provided an improved extruder construction which, thanks to the shallow peripheral recesses present in some or all of its chambers, the feed screws are held centered and are properly lubricated by the working medium so that friction and wear are reduced, thereby allowing the use of higher speeds. The reduction in shear stresses also decreases the input energy required for a given output rate.

I claim:

1. In an extruder for thermoplastic materials comprising a housing with a plurality of axially extending cylindrical chambers intercommunicating through a passage of a width less than the chamber diameter, and a like plurality of feed screws rotatable to drive a plastic mass in said chambers toward a discharge end of the housing, said feed screws intermeshing with one another at said passage and defining an entrance side and an exit side for said passage, the improvement wherein said housing is provided in the vicinity of said discharge end with at least one axially extending shallow peripheral recess in each of at least two of said chambers at a location remote from the entrance side of said passage for counteracting a lateral thrust exerted by said mass upon the corresponding feed screw, said recess being a single continuous groove spanning a multiplicity of turns of the threads of said corresponding feed screw and being of such shape and dimension that the thermoplastic material being extruded will flow easily into and out of said recess and will not lodge therein.

2. The improvement defined in claim 1 wherein said recess is of generally crescent-shaped cross-section.

3. The improvement defined in claim 1 wherein said feed screws form a counterrotating pair symmetrically disposed in said housing, each of the chambers associated with said feed screws being provided with said recess.

4. The improvement defined in claim 1 wherein said location is generally diametrically opposite said entrance side.

5. The improvement defined in claim 2 wherein said recess is one of two recesses extending substantially symmetrically on both sides of an axial plane passing through said entrance side.

6. The improvement defined in claim 3 wherein the two recesses on opposite sides of said axial plane extend past another axial plane perpendicular to the first-mentioned plane.

7. The improvement defined in claim 4 wherein each of said recesses terminates on a line peripherally spaced from said first-mentioned plane by substantially 120°.

8. The improvement defined in claim 7 wherein the recesses of said chambers are located on the same side of a common axial plane of said chambers.

* * * * *